United States Patent
Ito et al.

[11] Patent Number: 5,963,847
[45] Date of Patent: Oct. 5, 1999

[54] BOOSTER SYSTEM

[75] Inventors: Kazuhito Ito; Hiroshi Suzuki, both of Yokosuka; Manabu Nakada, Kawasaki; Yoshio Ebine, Yokohama, all of Japan

[73] Assignee: NTT Mobile Communications Network Inc., Tokyo, Japan

[21] Appl. No.: 08/860,373
[22] PCT Filed: Oct. 28, 1996
[86] PCT No.: PCT/JP96/03143
§ 371 Date: Jun. 25, 1997
§ 102(e) Date: Jun. 25, 1997
[87] PCT Pub. No.: WO97/15991
PCT Pub. Date: May 1, 1997

[30] Foreign Application Priority Data

Oct. 26, 1995 [JP] Japan ................................. 7-279006

[51] Int. Cl.$^6$ ................................................. H04B 7/14
[52] U.S. Cl. .................. 455/17; 455/21; 455/24
[58] Field of Search .................. 455/7, 10, 11, 455/15, 16, 17, 20, 21, 22, 24

[56] References Cited

U.S. PATENT DOCUMENTS

| | | | |
|---|---|---|---|
| 4,317,217 | 2/1982 | Davidson et al. | 455/24 |
| 4,776,032 | 10/1988 | Odate et al. | 455/10 |

FOREIGN PATENT DOCUMENTS

| | | |
|---|---|---|
| 0 227 393 | 7/1987 | European Pat. Off. . |
| 0133148 | 10/1980 | Japan ........................ 455/24 |
| 58-51632 | 3/1983 | Japan . |
| 58-204637 | 11/1983 | Japan . |
| 61-202533 | 9/1986 | Japan . |
| 62-69738 | 3/1987 | Japan . |
| 2-249321 | 10/1990 | Japan . |
| WO 84/02626 | 7/1984 | WIPO . |

Primary Examiner—Thanh Cong Le
Attorney, Agent, or Firm—Pollock, Vande Sande & Amernick

[57] ABSTRACT

A booster system for transmitting a received wave after amplifying it comprises a receiving antenna section, a carrier combining section, a transmitting section, a transmitting antenna section and a parameter control section. The carrier combining section multiplies a canceling signal by a cancel parameter to obtain a replica signal, then combines it with a received signal in at least one of the radio frequency band, the intermediate frequency band and the base band, and derives a combined base band signal from the combined signal. The transmitting section generates a send signal and a canceling signal by using a signal demodulated through the demodulation of the combined base band signal. Based on the combined base band signal and the canceling signal, the parameter control section determines a canceling parameter such that the power of the combined base band signal is reduced, the parameter being provided to the carrier combining section.

13 Claims, 4 Drawing Sheets

BOOSTER SYSTEM

TECHNICAL FIELD

The present invention relates to a booster system that is used to improve the reception in areas of weak radio waves, in a mobile communication system such as a radio paging system, in particular.

In mobile communication systems, communication quality declines in areas where radio waves from the base station are weak, for example, around zone edges (cell edges). Furthermore, since radio waves from the base station do not reach the back of a mountain, there are areas where no services can be provided because of some particular geographical features. Even in such areas high quality services could be offered by increasing the number of base stations, but this inevitably leads to the defect of increased costs for services.

As a solution to this problem there has been used a booster system capable of easily relaying radio waves. The booster system receives a desired signal, then amplifies the received signal, and sends radio waves of high intensity toward an object area at the same frequency as that of the received signal. However, the booster system has to clear some conditions. One of the most important issues is mutual coupling between a transmitting and a receiving antenna, resulting in amplified radio waves of high intensity, emitted from the transmitting antenna, getting mixed into signals received originally by the receiving antenna. The interference waves thus mixed in the received signals act as interference waves and make the booster operation unstable. As a solution to this problem, it is customary to space the two antennas sufficiently far apart so as to loosen the mutual coupling between them. In recent years, however, there is a need of downsizing the whole apparatus to reduce the cost for installation of the booster system—this makes it difficult to reduce the mutual coupling between the transmitting and receiving antennas by spatially separating them.

To meet the requirement, there have been proposed methods wherein the booster system is equipped with an interference canceling function as described below.

A first method is to superimpose a pilot signal on the send signal. With this method, as shown in FIG. 1, a received signal, which is the input into a receiving antenna 11, is combined by a combiner 12 with a feedback signal, then the combined signal from the combiner 12 is subjected to processing for the removal of out-band signals by band-pass filters 13 and 14 properly amplified by an amplifier 15, then the amplified signal is combined by a combiner 17 with a pilot signal from a pilot signal generator 16, and the combined signal is sent as the send signal via a transmitting antenna 18. On the other hand, the output send signal from the combiner 17 is branched by a coupler 19 and the branched signal is adjusted by an amplitude/phase controller 21 in amplitude and in phase, thereafter being fed as a feedback signal to the combiner 12. The combined signal from the combiner 12 is branched by a coupler 22, then a pilot signal is extracted by a filter 23 from the branched output, then the extracted signal and the pilot signal from the generator 16 are compared by a comparator 24, and the amplitude and phase of the feedback signal are controlled by the amplitude/phase controller 21 with the output from the comparator 24 so that the pilot signal component is reduced to zero in the combined signal from the combiner 12.

This method has a shortcoming that the send signal is disturbed by the addition thereto of the pilot signal.

A second method is to amplify the received signal after modulating it by a modulating signal. According to this method, as shown in FIG. 2, the combined signal from the combiner 12 is branched by the coupler 22 and is then demodulated by a demodulator 26 to obtain a modulated signal component, which is correlated by a correlator 28 with a modulating signal from a modulating signal generator 27, and the amplitude/phase controller 21 is controlled so that the correlation becomes zero. After having its out-band component rejected by the band-pass filter 13, the combined signal from the combiner 12 is modulated by the modulating signal from the modulating signal generator 27, and the modulated output is amplified by the amplifier 15 and provided via the band-pass filter 14 to the transmitting antenna 18.

In this prior art method, there is not any concrete amplitude/phase control algorithms that make the correlated output become zero. In addition, the method has a defect that the transmission wave differs from the original send signal because of a disturbance by its modulation.

As described above, the conventional interference canceling methods have a common defect that the signal is disturbed. Furthermore, since the disturbance is made a fluctuation component small enough not to affect the inherent signal transmission characteristics, a signal for forming an interference canceling loop is so weak that it is difficult to cancel interference with high accuracy.

It is therefore an object of the present invention to provide a booster system with which it is possible to cancel interference without superimposing a pilot signal on the transmission wave or modulating it and which permits accurate cancellation control.

SUMMARY OF THE INVENTION

The booster system according to the present invention comprises a receiving antenna section, a carrier combining section, a transmitting section, a transmitting antenna section and a parameter control section. The carrier combining section multiplies a canceling signal by a cancel parameter to obtain a replica signal, then combines it with a received signal in at least one of the radio frequency band, the intermediate frequency band and the base band, and derives a combined base band signal from the combined signal. The transmitting section generates a send signal and a canceling signal by using a signal demodulated through the demodulation of the combined base band signal. Based on the combined base band signal and the canceling signal, the parameter control section determines a canceling parameter such that the power of the combined base band signal is reduced, the parameter being provided to the carrier combining section.

Since the present invention cancels the interference component without insertion of a pilot signal into the send signal or its additional modulation as mentioned above, the send signal is free from disturbance and the interference cancellation performance is significantly improved because of adaptive signal processing by an error detection in the base band.

BEST MODE FOR CARRYING OUT THE INVENTION

The receiving antenna section receives a signal from the base station as a desired wave, while at the same time the received signal contains, as an interference wave mixed therein, a send signal emitted from the transmitting antenna section.

Figure 3:
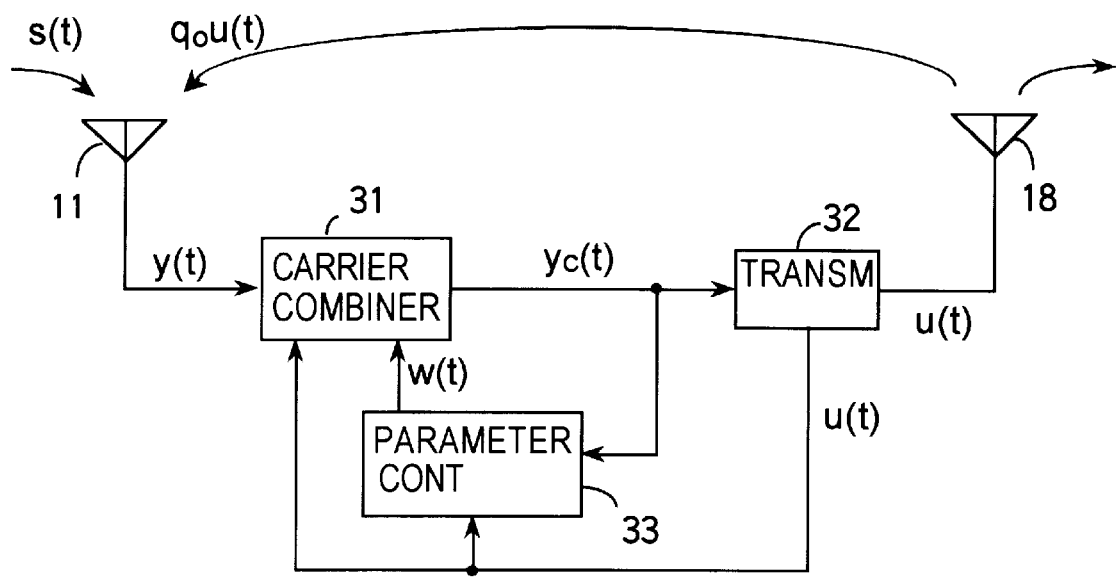
FIG. 3 is a block diagram illustrating an example of the basic configuration of the booster system according to the present invention.

In FIG. 3 there is illustrated the basic configuration of the present invention. Assume that every signal mentioned below is represented by a complex envelope. That is, a signal of a real number is represented by a complex envelope $x(t)$ such as $x_r(t) = \text{Re}\{x(t)\exp(j2\pi ft)\}$. A carrier combining section 31 combines a received signal $y(t)$ and a canceling signal $u(t)$ and derives a combined base band signal $y_c(t)$ from the combined signal as a complex envelope signal. The two signals may be combined in any stages of the radio frequency band, the intermediate frequency band and the base band, or in a desired combination of such frequency bands.

A transmitting section 32 generates a send signal and a canceling signal through utilization of a data signal that is obtained by demodulating the combined base band signal. The canceling signal is generated from a signal in a desired stage from the generation of a base band signal $u_b(t)$ by remodulating the demodulated version of the received signal to the generation of a radio frequency signal $u_r(t)$. Since the send signal is produced merely by multiplying the canceling signal by a certain complex number, the send signal and the canceling signal will hereinafter be represented by $u(t)$. A parameter control section 33 calculates a cancel parameter $w(t)$ from the combined base band signal and the canceling signal and outputs it to the carrier combining section 31.

A detailed description will be given of the operation of each section. As referred to above, a real number signal will be represented by the complex envelope $x(t)$ like $x_r(t) = \text{Re}\{x(t)\exp(j2\pi ft)\}$. Accordingly, the real part $\text{Re}\{x(t)\}$ represents the amplitude of an in-phase component and the imaginary part $\text{Im}\{x(t)\}$ represents the amplitude of the quadrature component. The carrier frequency $f$ will be represented by $f_r$ in the RF band (the radio frequency band), $f_i$ in the IF band (the intermediate frequency band) and 0 in the base band. The description with the complex envelope allows ease in representing similar processing in the RF band, the IF band and the base band.

Superimposed on the received signal complex envelope $y(t)$ received by a receiving antenna 11 are a desired wave complex envelope $s(t)$, an interference wave complex envelope $q_o u(t)$ that is a leakage of a send signal complex envelope $u(t)$ emitted from a transmitting antenna 18 and received by the receiving antenna, and a noise complex envelope $n(t)$. The signal complex envelope $y(t)$ is expressed by the following equation:

$$y(t) = s(t) + q_o u(t) + n(t) \tag{1}$$

where $q_o$ is a complex coupling coefficient between the transmitting and receiving antennas 11 and 18. The send signal $u(t)$ is produced by delaying a demodulated signal for a time $\tau_d$, then modulating it again to obtain a signal $s(t-\tau_d)$, and amplifying it by a complex gain $G$ with respect to the input level. The send signal is expressed by the following equation:

$$u(t) = G s(t-\tau_d) \tag{2}$$

The carrier combining section 31 multiplies the canceling signal $u(t)$ by the cancel parameter $w(t)$ to generate a replica signal complex envelope $r(t) = w(t)u(t)$ and utilizes the difference between the received signal $y(t)$ and the replica signal $r(t)$ to generate a combined signal complex envelope $y_o(t)$.

$$y_o(t) = y(t) - r(t) = y(t) - w(t)u(t) \tag{3}$$

As described later on with reference to FIG. 4, the carrier combining section 31 further processes the combined signal $y_o(t)$ by amplification, frequency conversion and band-pass filtering and outputs it as the combined base band signal $y_c(t)$. The combined base band signal $y_c(t)$ thus produced by amplification, frequency conversion and band-pass filtering is the same as a signal that is obtained by multiplying the combined signal $y_o(t)$ by a certain complex. The combined base band signal $y_c(t)$ is produced by the IQ detection of the combined signal $y_o(t)$, that is, by multiplying the input modulated signal by in-phase and quadrature carrier signals and eliminating harmonic components with a low-pass filter, and the real part $\text{Re}\{y_c(t)\}$ and the imaginary part $\text{Im}\{y_c(t)\}$ are output as two base band signals. These signals will hereinafter be identified intact by the complex number $y_c(t)$. Incidentally, the combined signals $y_o(t)$ in the RF band, the IF band and the base band differ in magnitude and in phase, but since their variations are each merely a fixed multiple of the complex number, they will be identified by $y_c(t) = y_o(t)$ in common to them for the sake of simplicity.

In the present invention, the interference signal may be canceled in the RF band, in the IF band, in the base band, or in an arbitrary combination thereof. In the case of canceling the interference signal in the base band, the canceling signal $u(t)$ in the base band is multiplied by the cancel parameter $w(t)$ to generate the replica signal $r(t) = w(t)u(t)$ in the base band and the difference between the received signal $y(t)$ and the replica signal $r(t)$ is used to directly generate the combined base band signal $y_c(t)$ by Eq. (3).

The combined base band signal $y_c(t)$ from the carrier combining section 31 is demodulated in the transmitting section 32 to obtain a demodulated data signal, which is again subjected to demodulation similar to that of the received signal, by which a send signal $u_r(t) = s(t-\tau_d)$ is generated. The send signal $s(t-\tau_d)$ is a radio wave of exactly the same type as the signal transmitted from the base station and a pilot signal is not superimposed on the send signal nor is its carrier modulated. The send signal $s(t-\tau_d)$ is transmitted from the transmitting antenna 18, while at the same time the canceling signal $u(t)$ is generated from the send signal and fed to the carrier combining section 31. In the parameter control section 33 the parameter $w(t)$ is controlled to be optimum so that the component of the send signal $s(t-\tau_d)$ is not contained in the combined base band signal $y_c(t)$.

A variety of methods can be used to calculate the parameter in the parameter control section 33 of the above booster system. A concrete example will be described below.

Assuming that the coupling coefficient $q_o$ between the transmitting and receiving antennas 18 and 11 does not fluctuate, the cancel parameter $w(t)$ naturally ought to remain unchanged and hence it will be identified by $w(t) = w$. The power of the combined base band signal $y_c(t)$ is the sum of the powers of a desired wave, an interference wave and noise when the interference wave is left unremoved. As the interference wave is removed using the replica signal r(t), the power of the combined base band signal $y_c(t)$ gradually decreases and when the interference wave is completely removed, the power of the combined signal $y_c(t)$ is minimum. Hence, in the case of using the power of the combined base band signal $y_c(t)$ as an evaluation function J, control expressed by the following equation is effected:

$$J=|y_c(t)|^2$$

$$<J>=<|y(t)-wu(t)|^2> \rightarrow \text{minimum power} \quad (4)$$

where |z| represents the absolute value of z and < > represents a set mean, which is a time mean in practice. The interference cancellation can be performed in any of the RF band, the IF band and the base band. Letting the cancellation in all of the three bands be y(t)−wu(t) and setting y(t)=s(t)+$q_o$u(t)+n(t), the evaluation function J can be modified as follows:

$$\langle J \rangle = \langle |s(t) + q_o u(t) + n(t) - wu(t)|^2 \rangle \quad (5\text{-}1)$$

$$\langle |s(t)|^2 \rangle + \langle |q_o - w|^2 |u(t)|^2 \rangle + \langle |n(t)|^2 \rangle +$$

$$2\text{Re}[\langle s^*(t)(q_o - w)u(t) \rangle + \langle s^*(t)n(t) \rangle + \langle (q_o - w)u^*(t)n(t) \rangle]$$

where $\sigma_s^2=<|s(t)|^2>$, $\sigma_u^2=<|u(t)|^2>$ and $\sigma_n^2=<|n(t)|^2>$ and $A^*$ represents a complex conjugate of A. Since noise is utterly random and has no correlation with the signals s(t) and u(t), $<s^*(t)n(t)>=0$ and $<u^*(t)n(t)>=0$.

Further, set $<s^*(t)u(t)>=\sigma_s\sigma_u\rho$, where p is a correlation coefficient between the signals s(t) and u(t). By such setting, Eq. (5-1) becomes as follows:

$$<J>=\sigma_s^2+|q_o-w|^2\sigma_u^2+2\sigma_n^2+2\sigma_s\sigma_u(q_o-w)\text{Re}[\rho] \quad (5\text{-}2)$$

Since the received signal is modulated after being demodulated, the delay time $\tau_d$ from the reception of the received signal to the generation of the modulated signal after the demodulation is sufficiently longer than the symbol period $T_s$ and the delay time $\tau_d$ can be regarded to be much greater than $T_s$. In this instance, the signals $S^*(t)$ and u(t) at time t are modulated differently, and since a mean value of their product, $<S^*(t)u(t)>$, is substantially zero, the correlation coefficient $\rho$ can be regarded to be approximately equal to zero. Hence, Eq. (5-2) becomes as follows:

$$<J>=\sigma_s^2+\sigma_n^2+|q_o-w|^2\sigma_u^2 \quad (6)$$

As will be seen from the above equation, under the condition that the interference can completely be canceled, that is, when $w=q_o$, the evaluation function J is minimized. In practice, however, since the value of the coupling coefficient $q_o$ is unknown, it is necessary to calculate its value by one algorithm or another. Now, let w at the sample point $kT_s$ be represented by w(k), omitting $T_s$, and consider iterative updating of the parameter w(k) by the steepest descent method (s.Haykin, Adaptive Filter theory, 2nd edition, Prentice-Hall, 1991) as follows:

$$w(k)=w(k-1)-(\mu/2)\partial J/\partial w|_{t=kT} \quad (7)$$

where $\mu$ is a step size. Partial differentiation of Eq. (4) gives $$\partial J/\partial w=-2y(t)u^*(t)+2u(t)u^*(t)w=-2y_c(t)u^*(t) \quad (8)$$

(see the above-mentioned literature). Substitution of this into Eq. (7) gives such an algorithm as follows:

$$W(k)=w(k-1)+\mu y_c(k)u^*(k) \quad (9)$$

As described above, the coefficient can be updated by multiplying the combined base band signal $y_c(t)$ by the conjugate complex number of the complex envelope of the canceling signal u(t) and the step size $\mu$. In other words, $\mu y_c(k)u(k)$ is fed back to the preceding cancel parameter w(k−1), by which the cancel parameter is updated.

Figure 4:
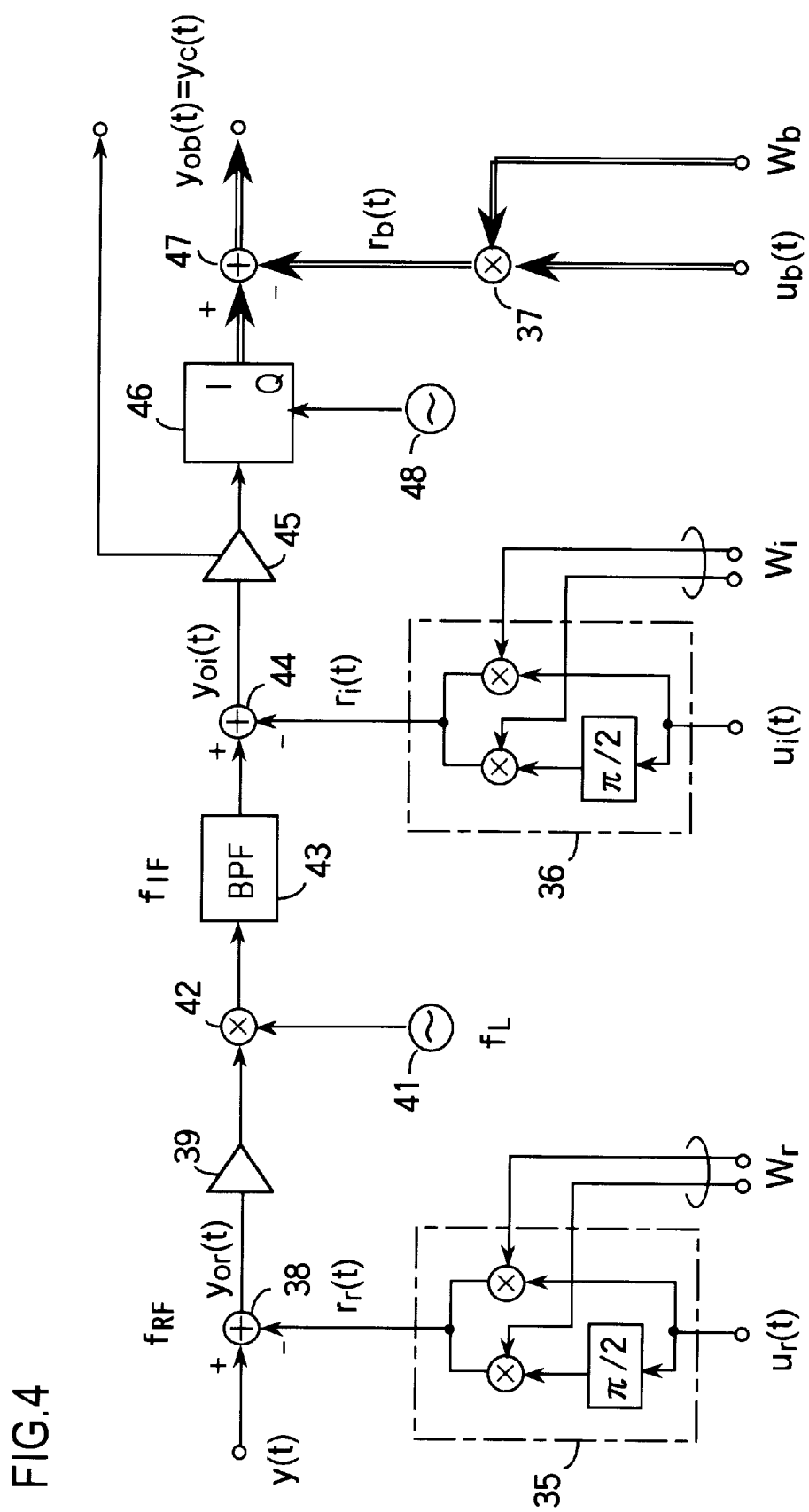
FIG. 4 is a block diagram showing a concrete example of a carrier combining section 31 in FIG. 3.

FIG. 4 illustrates in more detail an embodiment of the carrier combining section 31, in which signals are combined in each of the RF stage, the IF stage and the base band stage for cancellation of the interference signal. Three canceling signals $u_r(t)$, $u_i(t)$ and $u_b(t)$ are input from the transmitting section 32 in FIG. 3 (described later on with reference to FIG. 5) into the RF band, IF band and the base band stages, respectively. The parameter control section 33 (FIG. 3) is supplied with the base band combined signal $y_c(t)$ and the canceling signals $u_r(t)$, $u_i(t)$ and $u_b(t)$ from the transmitting section in FIG. 5 and creates cancel parameters $w_r(k)$, $w_i(k)$ and $w_b(k)$ for the RF band, the IF band and the base band, respectively, by the following equations:

$$w_r(k)=w_r(k-1)+\mu_r y_c(k)u_r^*(k) \quad (10)$$

$$w_i(k)=w_i(k-1)+\mu_i y_c(k)u_i^*(k) \quad (11)$$

$$w_b(k)=w_b(k-1)+\mu_b y_c(k)u_b^*(k) \quad (12)$$

where $\mu_r$, $\mu_i$ and $\mu_b$ represent correcting step sizes in the RF band, the IF band and the base band, respectively.

An RF complex envelope converter 35, made up of two multipliers and a $\pi/2$ phase shifter, complex-multiplies the RF canceling signal $u_r(t)$ by the parameter $w_r$ to generate an RF-band replica signal $r_r(t)$. Similarly, an IF complex envelope converter 36, formed by two multipliers and a $\pi/2$ phase shifter, generates an IF-band replica signal $r_i(t)$, and a base band complex multiplier 37 complex-multiplies the canceling signal $u_b(t)$ and the parameter $w_t$ to generate a base-band replica signal $r_b(t)$.

In a combiner 38 the received signal y(t) from the receiving antenna 11 and the replica signal $r_r(t)$ are combined, that is, the replica signal $r_r(t)$ is subtracted from the received signal y(t), thereby obtaining a composite signal $y_{or}(t)$ processed for interference cancellation in the RF band. The signal $y_{or}(t)$ is amplified by a low noise amplifier 39. The amplified output is fed to a frequency converter 42, wherein it is converted to an IF band signal by a local signal of a frequency $f_L$ from a local oscillator 41, then the converted output is filtered by a band-pass filter 43 and combined with the replica signal $r_i(t)$ in a combiner 44, that is, the replica signal $r_i(t)$ is subtracted from the filtered output, whereby the residual component of the interference signal in the IF band is canceled. The combined signal $Y_{oi}(t)$ processed for interference cancellation in the IF band is amplified by an AGC amplifier 45 and then fed to an IQ detector (a quadrature detector) 46, wherein the amplitudes of its in-phase and quadrature components are extracted. The quadrature detected output signal and the replica signal $r_b(t)$ are fed to a combiner 47, wherein the latter is subtracted from the former and from which a combined signal $y_{ob}(t)$ processed for interference cancellation in the base band is output as the combined base band signal $y_c(t)$.

By canceling the interference wave in three steps as described above, an optimum amount of cancellation can be set in hardware in each stage—this provides the advantage that excessively high accuracy is not required in each section. In FIG. 3, the power level of the signal $q_o u(t)$ that leaks from the transmitting antenna 18 to the receiving antenna 11 is usually about 30 to 40 dB higher than the power level of the desired signal s(t) at the receiving antenna 11, so that the interference cancellation processing by the RF-band combiner 38 using the RF-band replica signal $r_r(t)$ enables the maximum gain for the desired signal to be increased within the range over which the operation of the low noise amplifier 39 remains unsaturated. Besides, when the signal processing by the complex multiplier 37, the quadrature detector 46 and the combiner 47 in the base band is performed as digital processing, processing accuracy can be increased as compared with that of analog processing.

Figure 5:
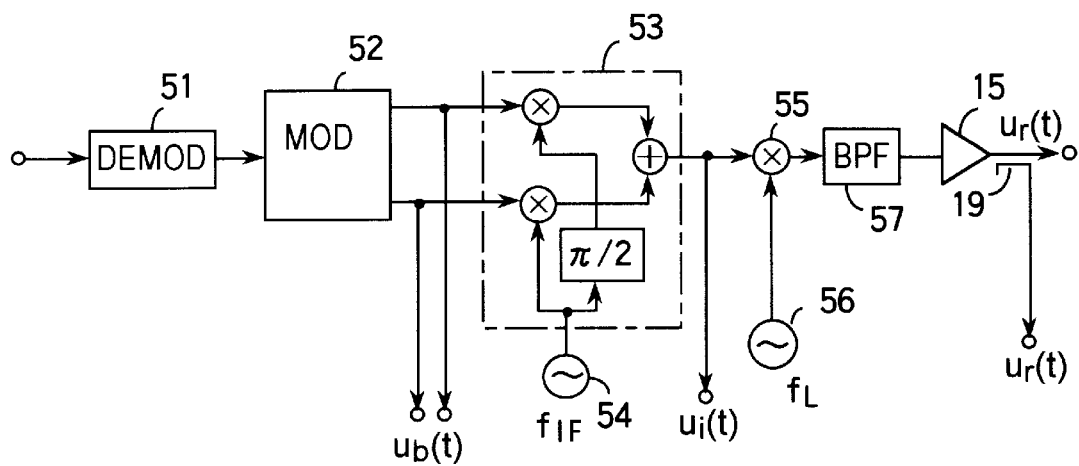
FIG. 5 is a block diagram showing a concrete example of a transmitting section 32 in FIG. 3.

FIG. 5 illustrates in detail an embodiment of the transmitting section 32 in FIG. 3. The combined base band signal $y_{ob}(t)$ or $y_c(t)$ in FIG. 4 is demodulated by a demodulator 51 into a data signal and a modulation is carried out again based on the data signal. This modulation is performed in two steps. In the first place, a base band modulated wave complex envelope (a base band modulated signal) $u_b(t)$ is generated by a modulator 52 using the data signal sequence, then this signal is fed to a quadrature modulator 53 composed of two multipliers, a $\pi/2$ phase shifter and an adder, wherein it is frequency converted by a local signal $f_{IF}$ from a local oscillator 54 into an IF-band modulated signal. The IF-band modulated signal $u_i(t)$ thus obtained is fed to a frequency converter 55, wherein it is further frequency converted by a local signal $f_L$ from a local oscillator 56 to an RF band signal, and the frequency converted signal is output as the send signal $u_r(t)$ via a band-pass filter 57 and the transmitting amplifier 15. The output from the modulator 52 is provided as the base-band canceling signal $u_b(t)$ to the multiplier 37 in FIG. 4, the output from the quadrature modulator 53 is provided as the IF-band canceling signal $u_i(t)$ to the complex envelope converter 36, and the send signal $u_r(t)$ is provided as the RF-band canceling signal $u_r(t)$ to the complex envelope converter 35 from the coupler 19.

In the FIG. 4 configuration the IF amplifier (the AGC amplifier) 45 is used as a level detector. More specifically, the output from a logarithmic amplifier serving as the level detector 45 or a gain control signal of an automatic gain control amplifier as the level detector 45 can be used as a level signal. The observation of a mean level by such a level detector permits calculation of the cancel parameters as described below.

When interference has not ever been canceled, the level is the combined power of the desired wave, the interference wave, noise and the replica as indicated by Eq. (6). By adjusting the amplitude and phase of the replica so that it cancels the interference wave, the composite level ought to drop. When the interference wave is canceled with the highest degree of accuracy, the output from the level detector 45 indicates the combined power level of the desired wave and noise and the power is minimum. Therefore, it is also possible to control the parameters $w_r$ and $w_i$ to minimize the detected level of the level detector 45 while observing the level. The parameters for adjusting the amplitude and phase are iteratively calculated by trial and error. However, this method is effective in the cancellation only in the RF band and the IF band since the cancellation must be done before processing proceeds to the level detector 45. Furthermore, no phase information is available and only the level is utilized for adjustment, so that there are cases where accuracy is not so high. Hence, this method is suitable to coarse adjustment. The parameter $w_b$ is adjusted using Eq. (9).

Figure 6:
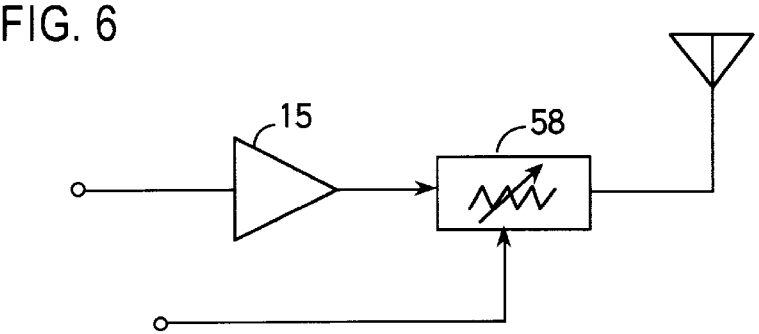
FIG. 6 is a block diagram illustrating an example that controls transmitting power.

FIG. 6 illustrates a modified form of the transmitting section 32, in which an attenuator 58 is provided as a level controller to control the transmission output. Immediately after the start of operation of the booster system the cancel parameters $w_r$, $w_i$ and $w_b$ do not yet converge to optimum values and a signal from which the interference wave has not sufficiently been removed is input into the demodulator 51. As a result, the demodulated data becomes completely random and the send signal is also modulated completely randomly. To avoid this, the output is held at a level at which the desired wave can be demodulated satisfactorily even if the interference wave is not canceled at the beginning and the output is gradually increased to such an extent that the cancel parameters can be obtained. The attenuator 58 is placed under the control of the parameter control section 33.

The receiving circuit of FIG. 4 and the transmitting circuit of FIG. 5 use many local oscillators. If their frequency accuracy is low, the phase of the complex envelope of the interference component, when observed in the base band, rotates with respect to the desired wave by a frequency setting error for each local oscillator. When the cancel parameters sufficiently follow the phase rotation, the interference can be canceled, but in practice, a steady phase error inevitably occurs due to the follow, deteriorating the parameter estimation accuracy. To avoid this, these local oscillators are synchronized by a phase lock loop with the output phase of one reference oscillator, by which the phases of the local oscillator outputs as well as their frequencies are synchronized. With the use of this method, the parameter control section 33 needs not to follow the phase rotation of the interference wave, so that the cancel parameters can be obtained with high accuracy.

The above description has been given on the assumption that the approximation $\rho \cong 0$ holds in Eq. (5-2). To implement this, it is necessary that $\tau_d \gg T_s$ and that $<s^*(t)u(t)>=<s^*(t)s(t-\tau_d)>\cong 0$. When the desired wave signal has its spectrum limited in a narrow band, long inter-symbol interference occurs with respect to the symbol period $T_s$, incurring the possibility of preventing the above-said approximation from holding. This problem can be overcome by setting the carrier frequency of the send signal u(t) slightly off the carrier frequency of the received desired wave signal s(t). Now, let $f_r$ represent the carrier frequency of the received wave from the base station that is the desired wave s(t) for the booster system, and let $f_r'$ represent the sending carrier frequency of the booster system. The send signal u(t) can be expressed by the following equation using the send signal $u_o(t)$ in the case of no frequency offset being provided:

$$u(t)=u_o(t)exp(j2\pi\Delta ft) \qquad (13)$$

$$\Delta f=f_r'-f_r \qquad (14)$$

When $\Delta f=0$, u(t) becomes $u_o(t)$. The frequency offset $\Delta f$ is chosen such that the signal spectrum of the send signal u(t) falls within a predetermined band. By this, even if the requirement for Eq. (6), $<s^*(t)u_o(t)>\cong 0$, is not satisfied, that is, even if the correlation between the signals s(t) and $u_o(t)$ becomes zero, a mean of $exp(j2\pi\Delta ft)$ becomes zero after the elapse of time sufficiently longer than a time constant $1/\Delta f$, and the following equation can be made zero:

$$\rho=<s^*(t)u_o(t)exp(j2\pi\Delta ft)>/(\sigma_s\sigma_u) \qquad (15)$$

Figure 1:
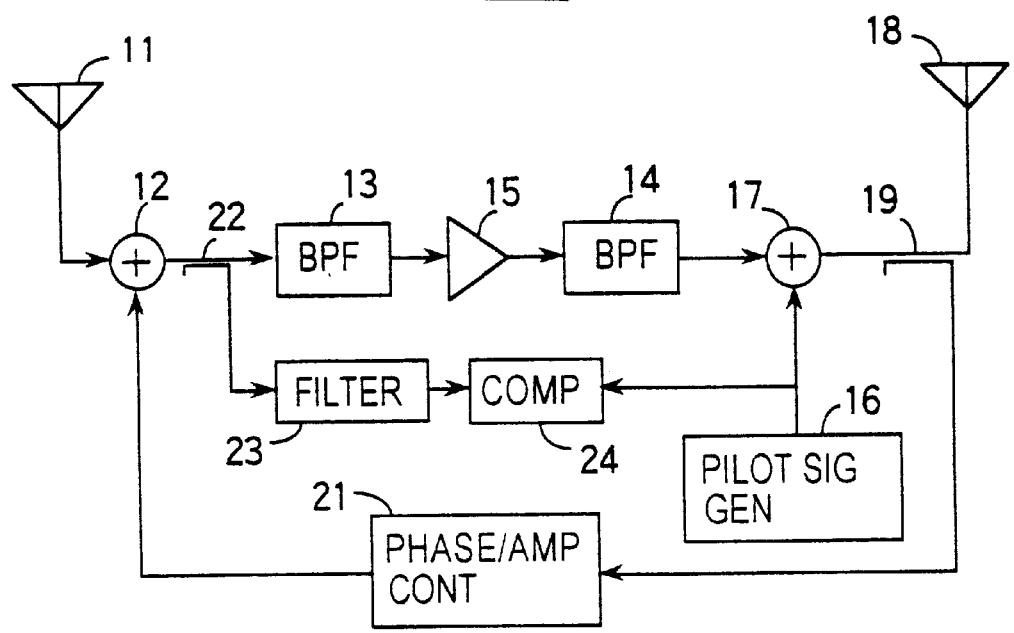
FIG. 1 is a block diagram showing a conventional booster system that uses a pilot signal to cancel interference.
Figure 2:
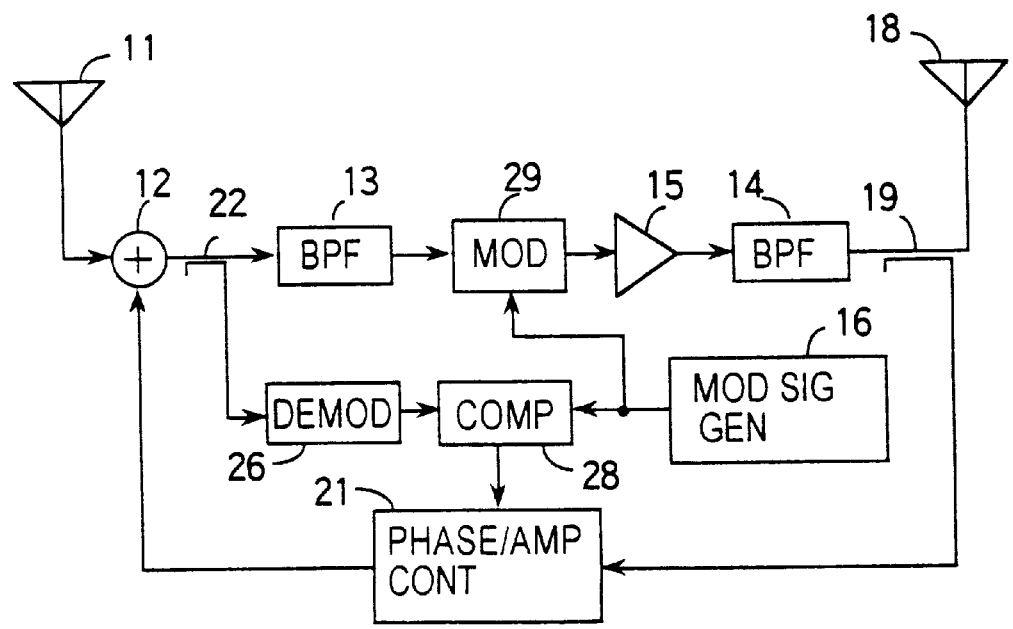
FIG. 2 is a block diagram showing a conventional booster system that performs a particular modulation to cancel interference.

This method provides a slight frequency offset $\Delta f$ and can hold it within a permissible range as an ordinary in-band frequency drift. Hence, this method does not so much disturb the signal as much as in the case of the second-mentioned conventional method (FIG. 2).

A concrete method is to provide the frequency offset in the modulator 52 in FIG. 5. The modulator 52 outputs the in-phase and quadrature components of the signal u(t) as the base band signal. That is, the modulator outputs the signal u(t) as $u_b(t)$. Since the base band signal $s(t-\tau_d)$ is output when no frequency offset is provided, the signal $u_b(t)$ at this time will be identified as $u_{bo}(t)$. That is, $u_{bo}=s(t-\tau_d)$. The frequency offset can easily be obtained through complex multiplication of $u_{bo}(t)$ by $\exp(j2\pi\Delta ft)$ in the modulator. At this time, $u_b(t)=u_{bo}(t)\exp(j2\pi\Delta ft)$. The modulator, which provides the frequency offset, outputs the in-phase and quadrature components of the signal $u_b(t)=u_{bo}(t)\exp(j2\pi\Delta ft)$ as the base band signal $u_b(t)$. Since the signal $u_b(t)$ thus generated has the frequency offset $\Delta f$, the replica signals $u_b(t)$, $u_i(t)$ and $u_r(t)$ in FIG. 5 also contain the offset. Since the thus frequency-offset send wave $u_r(t)$ leaks to the receiving antenna, the leakage signal can be canceled by the offset replica signals. Therefore, the description from Eqs. (4) through (12) holds true as it is.

Another method is to offset the oscillation frequency $f_{IF}$ or $f_L$ of the local oscillator 54 or 56 in FIG. 5 by $\Delta f$. These oscillators are synchronized with the local oscillators 41 and 48 at the receiving side (FIG. 4) as described previously, and an accurate frequency offset $\Delta f$ can be obtained by offsetting the frequencies of the former while maintaining their phase synchronization with the latter. Let it be assumed that the frequency offset $\Delta f$ is provided to the local oscillator 54. In this case, since the signals $u_i(t)$ and $u_r(t)$ are also merely offset by $\Delta f$, the cancel algorithm is the same as the aforementioned. Since no offset is provided for the signal $u_b(t)$, it is regarded as the signal $u_{bo}(t)$ and its complex-multiplied version $u_b(t)=u_{bo}(t)\exp(j2\pi\Delta ft)$ is input into the complex multiplier 37 in FIG. 4. Alternatively, the signal $u_{bo}(t)$ is input intact into the complex multiplier 37 and $w_b\exp(j2\pi\Delta ft)$ obtained by multiplying the cancel parameter $w_b$ by $\exp(j2\pi\Delta ft)$ is fed to the complex multiplier 37—this also produces the same effect as mentioned above.

In the above the coupling coefficient $q_o$ between the transmitting and receiving antennas of the booster system has been described to be constant. In practice, however, the coefficient $q_o$ is considered to vary with a change in the surrounding environment such as a temperature change. If this change is gentle, the algorithm of Eq.(9) ought to adaptively follow the change in the coefficient $q_o$. The following rate can be adjusted using the step size $\mu$ ($\mu_r$, $\mu_i$, $\mu_b$). Theoretically, $1/\mu$ is a time constant of this algorithm, which increases with a decrease in the step size $\mu$, and highly accurate interference cancellation can be achieved using a long time mean. On the other hand, an increase in the step size $\mu$ causes a decrease in the time constant and the algorithm quickly follows the coefficient fluctuation.

In general, the cancel sections in the RF band and the IF band use analog circuits as their components, and hence they are not so high in accuracy. On the other hand, the cancel section in the base band performs digital signal processing, and hence it is highly accurate and capable of fine control. With the cancellation in the base band, however, saturation of the low noise amplifier or the like cannot be deal with. For this reason, it is desirable to perform each cancellation in correspondence with one component of q. The coupling coefficient is considered to be separated such that $q=q_o+\Delta q$, where $q_o$ is a gentle variation component as mentioned above and $\Delta q$ a relatively quick variation component. In general, it is considered that $q_o$ is much greater than $\Delta q$ in many cases. Hence, in the cancellation in the RF and IF bands the step size $\mu_r$ or $\mu_i$ in Eq. (10) or (11) is chosen relatively small. This cancels the gently varying components of tight coupling. The step size $\mu_b$ is chosen relatively large for the purpose of canceling the residual component and the rapidly varying component by the base band canceler. The base band cancellation is carried out by digital signal processing, and hence it is highly accurate. Furthermore, an RLS algorithm and Kalman filter known as excellent adaptive signal processing, other than Eq. (12), can be employed according to the rate of fluctuations.

EFFECT OF THE INVENTION

As described above, the present invention cancels the interference component without involving the insertion of a pilot signal and modulation, and hence it does not ever disturb the transmission wave and has significantly excellent interference cancellation performance because of adaptive signal processing in the base band. The present invention is of great utility when employed in mobile communication, especially in the booster system of the radio paging system.

We claim:

1. A booster system comprising:

a receiving antenna;

a carrier combining section wherein a replica signal generated by multiplying a canceling signal by a cancel parameter and a received signal are combined in at least one of the radio frequency band, the intermediate frequency band and the base band and a combined base band signal is derived from the combined signal;

a transmitting section for generating a send signal and said canceling signal through utilization of a data signal obtained by demodulating said combined base band signal;

a transmitting antenna section for sending said send signal; and a parameter control section for calculating said cancel parameter from said base band signal and said canceling signal so that the power of said base band signal is reduced, and for outputting said cancel parameter to said carrier combining section.

2. The booster system of claim 1, wherein said parameter control section means for iteratively generating said cancel parameter updated by adding the product of said base band signal, said canceling signal and a step coefficient to the previous cancel parameter.

3. The booster system of claim 1 or 2, wherein said carrier combining section performs said combining, said transmitting section has modulating means for generating said send signal, and said base band signal is provided as said canceling signal to said carrier combining section.

4. The booster system of claim 1, which further comprises a level detector for detecting the level of said combined signal and said parameter control section includes means for iteratively determining said cancel parameter such that the level of said combined signal detected is minimized.

5. The booster system of any one of claims 1–2 and 4, wherein said transmitting section includes level control means for adjusting the level of said send signal and said level control means is controlled by a control signal from said parameter control section.

6. The booster system of any one of claims 1–2 and 4, comprising local oscillators for frequency conversion whose output phases are all synchronized with one reference oscillator.

7. The booster system of claim 1 or 2, wherein: said transmitting section includes a modulator for modulating said data signal to generate a base band modulated signal; said canceling signal contains said base band modulated signal; said cancel parameter generated by said parameter control section contains a base band cancel parameter generated based on said combined base band signal and said base band modulated signal; and said carrier combining section comprises a multiplier for complex-multiplying said base band replica signal and said base band cancel parameter to generate a base band replica signal, and a base band combining section for combining said combined base band signal and said base band replica signal to obtain a combined base band signal processed for interference cancellation.

8. The booster system of claim 7, wherein: said canceling signal contains said send signal in the radio frequency band; said cancel parameter generated by said parameter control section contains a radio frequency cancel parameter generated based on said send signal and said combined base band signal; and said carrier combining section comprises a complex envelope converter for complex-modulating said radio frequency send signal by said radio frequency cancel parameter to generate a radio frequency replica signal, and a radio frequency combining section for combining said received signal and said radio frequency replica signal to obtain a combined radio frequency signal processed for interference cancellation.

9. The booster system of claim 8, wherein: said transmitting section includes quadrature modulating means for generating an intermediate frequency modulated signal by quadrature-modulating said base band modulated signal, and frequency converting means for converting said intermediate frequency modulated signal to a send signal of said radio frequency band; said canceling signal contains said intermediate frequency modulated signal generated by said quadrature modulating means; said cancel parameter generated by said parameter control section contains an intermediate frequency cancel parameter generated based on said intermediate frequency modulated signal and said combined base band signal; and said carrier combining section comprises received signal frequency converting means for converting said combined radio frequency signal to an intermediate frequency signal, an intermediate frequency complex envelope converter for complex-modulating said combined radio frequency signal by said intermediate frequency cancel parameter to generate an intermediate frequency replica signal; an intermediate frequency combining section for combining said intermediate frequency received signal and said intermediate frequency replica signal to obtain a combined intermediate frequency signal processed for interference cancellation; and quadrature detecting means for quadrature-detecting said combined intermediate frequency signal to generate said combined base band signal.

10. The booster system of claim 8, wherein a low noise amplifier is provided for amplifying said combined radio frequency signal from said radio frequency combining section.

11. The booster system of claim 7, wherein said multiplier and said base band combining section are means for digital operation.

12. The booster system of claim 1, wherein said transmitting section generates said send signal of a carrier frequency having an offset relative to the carrier frequency of a desired received wave and feeds said canceling signal of the offset frequency back to said carrier combining section.

13. The booster system of claim 1, wherein said parameter control section iteratively updates said cancel parameters of at least said radio frequency band and said base band in accordance with adaptive algorithms, the time constant of said adaptive algorithm for said radio frequency band being chosen larger than the time constant of said adaptive algorithm for said base band.

* * * * *